United States Patent [19]

Branick

[11] 3,865,172

[45] Feb. 11, 1975

[54] TIRE BEAD BREAKING APPARATUS

[76] Inventor: Charles Earl Branick, 1601 S. 9th St., Fargo, N. Dak. 58102

[22] Filed: Feb. 1, 1973

[21] Appl. No.: 328,643

[52] U.S. Cl. .............................. 157/1.26, 157/1.28
[51] Int. Cl. ............................................ B60c 25/06
[58] Field of Search .......... 157/1.17, 1.26, 1.28, 1.2

[56] References Cited
UNITED STATES PATENTS

| | | | |
|---|---|---|---|
| 2,512,864 | 6/1950 | Koester | 157/1.2 |
| 2,534,950 | 12/1950 | Butterfield et al. | 157/1.28 |
| 2,656,882 | 10/1953 | Rodgers | 157/1.26 |
| 3,051,224 | 8/1962 | Pearne | 157/1.28 |
| 3,168,130 | 2/1965 | Turpin | 157/1.28 |
| 3,426,827 | 2/1969 | Whited et al. | 157/1.26 |
| 3,556,193 | 1/1971 | Duquesne | 157/1.28 |

Primary Examiner—Donald G. Kelly
Assistant Examiner—Harold P. Smith, Jr.
Attorney, Agent, or Firm—Fred Wiviott

[57] ABSTRACT

Apparatus for breaking the beads of tires mounted on heavy vehicles such as earth movers and including a generally U-shaped frame for straddling the tire and positioning one of a pair of bead breaking fingers on each of the opposite sides of the tire adjacent the wheel rim flange. Each bead breaking finger is carried on the inner end of a member slidably mounted on one of the frame arms for movement generally parallel to the wheel axis and adapted to be engaged by a fluid operated ram. Upon the application of force, one of the finger support members is forced inwardly to move the tire bead away from the bead seat. The incident angle of the bead breaking fingers may be adjusted to correspond to different wheel sizes.

26 Claims, 6 Drawing Figures

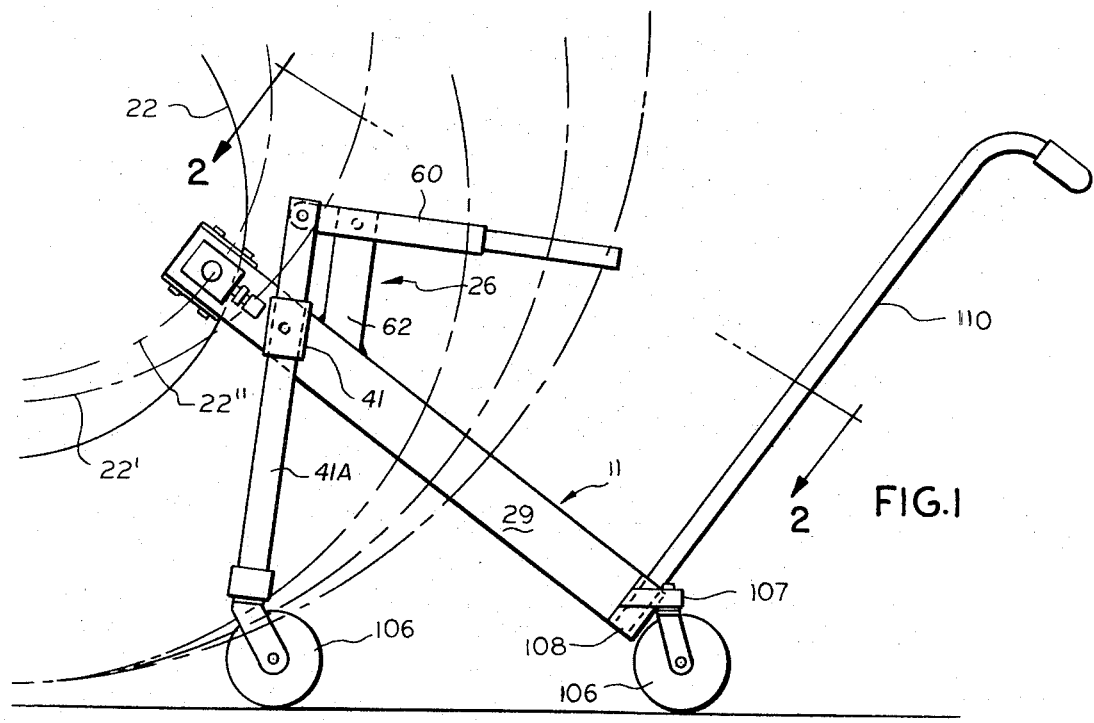
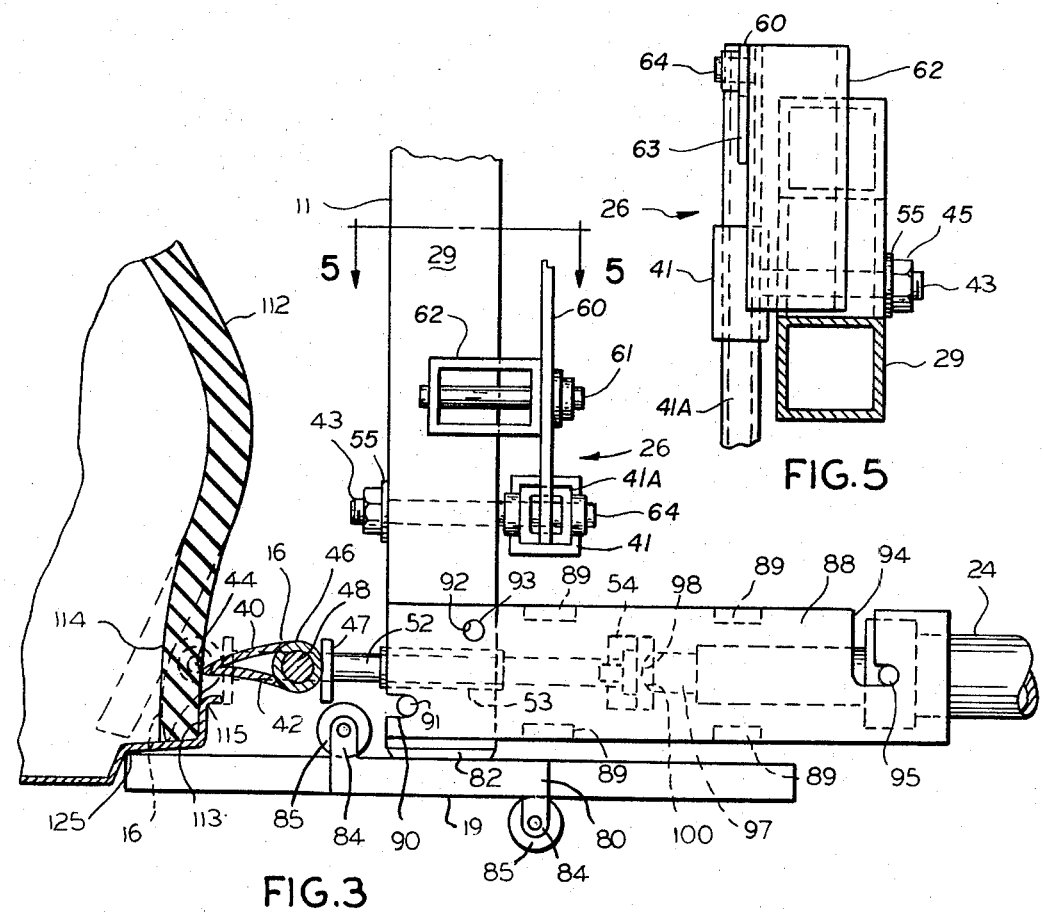

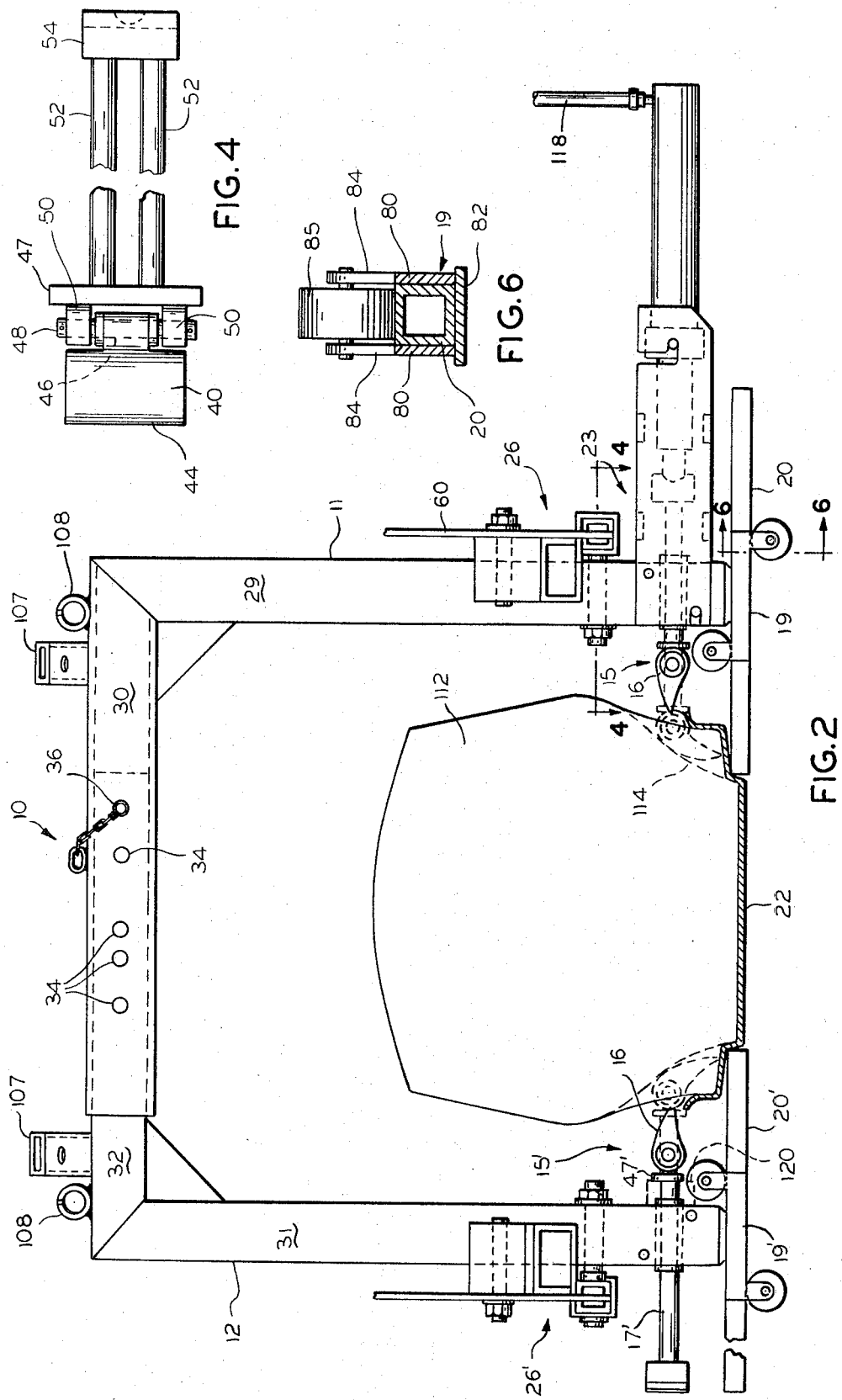

TIRE BEAD BREAKING APPARATUS

BACKGROUND OF THE INVENTION

This invention relates to tire bead breaking devices and more particularly for the tires of relatively heavy vehicles, such as earth moving equipment.

As is well known in the art, the beads of small tires such as automobile tires are usually broken by removing the wheel from the vehicle, placing it in a horizontal position on a tire support apparatus and breaking the bead from the wheel flanges with a portable tool which engages the tire adjacent the tire bead seat. Tools of this type are not effective for breaking the beads of relatively large tires particularly when the wheel remains affixed to a vehicle.

SUMMARY OF THE INVENTION

It is a primary object of this invention to provide an apparatus for breaking tire beads of relatively large tires.

A further object of the invention is to provide a portable tire bead breaking tool which is adapted to break the bead at either side of a tire while the associated wheel remains mounted.

Another object of the invention is to provide a tire bead breaking apparatus which is effective for breaking the beads at both sides of the tire.

A still further object of the invention is to provide for a tire bead breaking tool which is adapted to apply the bead breaking force to be applied from either side of the wheel.

Still another object of the invention is to provide for a tire bead breaker which is non-injurious to the tire carcass.

Another object of the invention is to provide a tire bead breaker which is adjustable to different tire sizes.

How these and still other objects of the invention are achieved will appear from time to time throughout the more detailed descriptions of a preferred embodiment which will be set forth hereafter in conjunction with the drawings. In general terms, the invention includes frame means including adjustable means for engaging the opposite sides of the wheel and tire bead breaking carrier means mounted on the frame and adapted to be moved inwardly for forcing a tire bead breaking element into engagement with the tire bead. According to its more specific aspect, a tire bead breaking element and carrier is mounted at each side of the frame for breaking the bead at both sides of the wheel. The frame may be adjustably supported so that the angle of the bead breaking element may be adjusted to correspond to different size wheel rims.

BRIEF DESCRIPTION OF THE DRAWINGS

FIG. 1 is a side elevational view of the beak breaking apparatus of the invention in operative position;

FIG. 2 is a view taking along lines 2—2 of FIG. 1;

FIG. 3 is a fragmentary view showing a portion of the tire bead breaking apparatus illustrated in FIG. 2;

FIG. 4 is a view taken along lines 4—4 of FIG. 2 with parts broken away; and

FIG. 5 is a view taken along lines 5—5 of FIG. 3.

FIG. 6 is a view taken along line 6—6 of FIG. 2.

DESCRIPTION OF A PREFERRED EMBODIMENT

Referring to FIGS. 1 and 2, the tire bead breaking apparatus 10 according to the preferred embodiment of the invention is shown to include a pair of generally L-shaped frame members 11 and 12 which are telescopingly coupled at their bases for lateral adjustment. Tire bead breaking assemblies 15 and 15' are respectively disposed at the free ends of the frame members 11 and 12 and include a bead breaking finger 16 carried on a finger drive assembly 17 mounted on their respective frame member for sliding movement in an inward generally perpendicular direction. Also mounted on the end of frame members 11 and 12, respectively, are slide guides 19 and 19' which respectively carry slide members 20 and 20' for movement into engagement with adjacent sides of a wheel rim 22 to provide a rigid coupling during bead breaking operations. An adapter 23 may be releasably coupled to either of the frame members 11 or 12 in a direction generally coaxial to the respective finger drive assembly 17 whereby a ram 24 may be actuated to supply a bead breaking force to the drive assembly 17. Frame angle adjustment assemblies 26 and 26' are coupled to the frame members 11 and 12, respectively, for adjusting the horizontal angle thereof which in turn adjusts the angle of the bead breaking finger whereby it may be made to correspond to the wheel rim circumference of various sized wheels.

The frame members 11 and 12 may be fabricated of any suitable material such as rectangular steel tubular sections joined at their ends. The sections forming member 11 are identified by reference numerals 29 and 30 and the sections forming member 12 are identified by reference numerals 31 and 32. The tubular sections are sized such that tube 32 forming the base of frame member 12 is telescopingly received within tube 30 forming the base of frame member 11. In addition, section 30 has a plurality of apertures 34 formed therein and spaced apart in a relationship which corresponds to standard wheel widths. The openings 34 are formed in each of the upper and lower sides of tube section 30 and a pair of registerable apertures (not shown) are formed through the upper and lower sides of tube section 32 and adjacent the end thereof so that frame members 11 and 12 may be coupled in any suitable manner such as by a pin 36 extending through the aligned openings. It will be appreciated that the distance between the side sections 29 and 31 of frame members 11 and 12 will be determined by which pair of the openings 34 in member 30 are coupled with the single pair of openings in the member 32 and, accordingly, the wheel width with which the apparatus is to be employed.

The bead breaking assembly 15, the slide guide 19, the slide 20 and the frame angle adjustment assembly 26 affixed to the end of frame member 11 are identical to the correspondingly numbered assemblies 15', 19', 20' and 26' affixed to the end of frame member 12 except that one group is the mirror image of the other, or in other words, all corresponding parts are reversed. Accordingly, only the assemblies 15, 19, 20 and 26 will be described in detail for the sake of brevity.

As seen in FIGS. 3 and 4, the bead breaking finger 16 may be formed of an upper convex arcuate member 40, a lower convex arcuate member 42 which are joined along their forward edges to form a bead breaking tip 44. The other ends of each of the plates 40 and 42 are of reduced width and are suitably affixed to a hinge tube 46. In this manner, the bead breaking finger 16 may be pivotally connected to the front face of an elongate, generally rectangular bracket member 47 by means of a hinge pin 48 which extends through hinge tube 46 and a pair of similar tube members 50 affixed to bracket 47 and disposed in registry with the outer ends of hinge tube 46. A pair of slide bars 52 are affixed at one end to the rear face of bracket 47 and extend rearwardly in general parallelism with their opposite ends being suitably secured to a drive plate 54. As seen in FIG. 3, the slide bars 52 extend through a pair of slide bearing assemblies 53 which are disposed in the end of frame section 29 in general parallelism with each other and extending in a direction normal to the longitudinal axis of said section. Also as seen in FIGS. 3 and 4, the bead breaking tip 44 is parallel to the plane containing the axes of slide bars 52 so that said tip 44 may be positioned in a plane normal to said longitudinal axis of frame member 12.

The frame 11 is shown in FIG. 1 to be positioned at an angle such that the bead breaking tip 44 of finger 16 lies along the edge of the wheel rim 22. However, if the apparatus is to be employed for breaking the bead of a different size tire and rim, such as 22' or 22'', for example, the incident angle of frame 11 may be changed by the frame angle adjustment assembly 26 in order that the bead breaking finger tip 44 may correspond to the wheel rim edge.

As seen in FIGS. 1, 3 and 5, the frame angle adjustment assembly 26 includes a short tubular member 41 which is affixed to the side of frame section 29 and is slidably received over one of a pair of substantially vertical tubular post members 41A. Member 41 is affixed to the side of the frame section 29 by means of a pin 43 which is suitably affixed, such as by welding, to the side of member 41 and extends transversely through aligned openings in frame section 11. Pin 43 may be retained in the openings in section 11 in any suitable manner such as by a nut 45 which engages the threaded end thereof. The assembly 26 also includes a lift lever 60 which is pivotally mounted intermediate its ends by means of a pin 61 on a hollow tubular bracket 62 affixed at its lower end to frame section 29 and extending upwardly therefrom at an acute angle relative to the longitudinal axis of said frame section. As seen in FIG. 3, the bracket member 62 is generally rectangular in horizontal cross section and one side thereof is offset and extends beyond the outer edge of frame section 29 so that lever 60 may be received in a short longitudinal slot 63 formed in the upper end of post 41A. The end of lever 48 is pivotally coupled to post 41A by means of a pin 64 which extends through aligned openings in said post and lever.

Those skilled in the art will appreciate that the angle of incidence of frame members 11 and 12 may be adjusted by loosening the various nuts which hold pins 43, 61 and 64 so that the lever 60 may be pivoted to slide member 41 along post 41A. In a similar manner, the frame angle adjustment apparatus 26' at the opposite side of the assembly may be similarly adjusted. Alternatively, the washers 55 associated with the nuts of the assembly 26 may be of the friction type whereby the frame angle may be adjusted merely by forcing the lever in one direction or the other and without loosening said nuts. It can be seen that by elevating the free end of lever 60 the member 41 will slide upwardly on post 41A to increase the angle of incidence of frame members 11 and 12 and conversely by depressing the free end of lever 60, member 41 will slide downwardly on post 41A to decrease the angle of incidence. When the frame members 11 and 12 have been positioned at the correct angle, the various nuts are tightened to fix the apparatus in position.

As seen in FIGS. 3 and 6, the slide guide assembly 19 may include a pair of generally rectangular plate members 80 which are suitably affixed edgewise in a parallel relation to a base plate 82 which in turn is affixed to the end of frame section 29. This locates the plate members 80 generally normal to the longitudinal axis of frame member 11. A pair of integral brackets 84 extend from a pair of diametrically opposite corners of each plate member 80 to provide two pair of parallel bracket members at the opposite corners of guide assembly 19. A pair of rollers 85 are journaled between each pair of bracket members 84 and are sized such that one of the outer circumferential surfaces of each roller 85 lies in a plane containing corresponding edges of plate members 80. The slide member 20 is generally tubular and has a cross sectional configuration which conforms to the gap between plate members 80 on the one hand and base member 82 and rollers 85 on the other. As a result, guide member 20 may be positioned for longitudinal movement within said gap.

The adapter 23 may comprise a pair of plates 88 suitably joined in a parallel relation by cross members 89. The gap between plates 88 are preferably equal to the width of frame section 29 to which it may be secured in any suitable manner such as by a generally U-shaped slot 90 formed in the end of each plate for receiving one of a pair of lugs 91 extending integrally from each side of frame member 11. In addition, registerable openings 92 may be formed in each of the plates 88 and in frame member 11 for receiving therethrough a hitch pin 93.

The opposite ends of adapter plate 88 may have a bayonet type slot 94 for receiving lugs 95 formed on the head of a suitable power source such as fluid operated cylinder 24. The ram head 97 of cylinder 24 is thereby positioned in a coaxial relation relative to finger guide assembly 17 and has semi-hemispherical tip 98 which engages a correspondingly shaped recess 100 in plate 54.

In order to facilitate movement of the assembly 10 into a tire bead breaking position, casters 106 may be suitably mounted at the lower ends of each of the tubular members 41A and to the opposite corners of bracket member 107. In addition, each of frame members 11 and 12 may have a short tubular member 108 affixed thereto for receiving the lower ends of one of a pair of handle members 110.

The operation of the apparatus will be discussed with respect to FIGS. 2 and 3. Initially, the vehicle is jacked up so that the tire 112 is elevated to clear the support surface. The assembly 10 is then rolled into position and the pin 36 removed from the aligned openings in the base tubular portions 30 and 32 and the latter positioned to correspond to the size of wheel 22. Pin 36 is then reinserted and finger drive assembly 15' is positioned with its bracket 47' in engagement with frame section 31 and its bead breaking finger 16' engaging the tire bead 114. Finger drive assembly 15 is then pushed inwardly to position the bead breaking edge 44 of its breaking finger 16 adjacent the bead 114 of tire 112 and, if necessary, the angle of incidence of frame members 11 and 12 may be adjusted as in the manner indicated above to position the tips 44 and bead breaking fingers 16 and 16' in alignment with the periphery of the rim 22. In order to minimize the number of holes 34 and yet permit the assemblies 15 and 15' to be correctly positioned as discussed above, a spacer shoe 120, as shown by dashed lines in FIG. 2, may be positioned between the bead breaking finger bracket 47' and frame section 31 if the correct spacing is not otherwise achieved. After the bead breaking assemblies 15 and 15' have been positioned, adapter 23 and ram 24 are then positioned on the side of the frame which corresponds to the outside of tire 112 and wheel 22 whereby ram 24 extends away from the vehicle upon which the wheel and tire are mounted. Each of the slide bars 20 are moved inwardly until their inner ends engage the rim bead seat 115 as shown in FIGS. 2 and 3. The edge 44 of finger 16 should then be extending generally inwardly and in a coaxial relation to drive assembly 17 and should engage the tire bead 114 at a point just above the periphery 115 of rim 22.

The ram 24 may be supplied with pressurized fluid through hose 118 from any suitable source, such as a hand pump. As a result, force is applied to the near side tire bead 114' directly through assembly 15 and to the far side tire bead through finger 16' due to the reaction forces. Also, as pressure is applied to ram 24, finger 16 moves into high pressure engagement with the tire, the reaction forces on frame 11 force the outer ends of guide members 20 generally downwardly as viewed in FIG. 2 whereby the latter jam against the thin respective rollers 85 to provide a clamping effect on rim 22. Initially, the bead 114 will break at one side of the tire 112, depending on which side provides the least resistance. For example, assume the bead at the right side of FIG. 2 breaks first. In this case, the bead breaking finger 16 will move from its position shown by full lines to its position shown by dashed lines in FIGS. 2 and 3 wherein the bead 114 is moved off of the wheel drop center 125. When the bead breaking finger 16 reaches its position shown by dashed lines, the finger bracket 47 will engage the periphery 115 of rim 22 thereupon transferring the driving forces to the opposite side of the assembly 10. As the fluid pressure force continues, the entire assembly 10, will in effect, move toward the right whereby the finger 16' moves relative to the tire 112 from its position shown by full lines in FIG. 2 to its position shown by dashed lines to thereby break the bead and push the same away from the bead seat and to its position shown by dashed lines in the drawing. If it is desired to unseat the tire beads at the opposite side of the vehicle, the adapter 22 and ram 24 will be placed on the frame section 31 and the process completed after the assembly has been repositioned.

While only a single embodiment of the invention has been illustrated and described, it is not intended to be limited thereby but only by the scope of the appended claims.

I claim:

1. A device for breaking tire beads comprising:
 frame means having a pair of arm means for straddling a wheel rim,
 rim engaging means mounted on each of said arm means each of said rim engaging means being movable in a direction generally parallel to the axis of said wheel rim.
 first means mounted on each of said arm means for movement in a direction generally parallel to said axis,
 bead breaking means mounted on one end of each of said first means and directed inwardly toward said tire, said first means being constructed and arranged to position said bead breaking means in contact with the tire bead adjacent said wheel rim,
 second means engageable with said first means for forcing said bead breaking means into high pressure engagement with said tire bead to move the same away from the wheel rim, said second means being operative to apply a bead breaking force to the other end of said first means, the application of a bead breaking force to said first means being operative to lock said rim engaging means in position.

2. A device for breaking tire beads comprising:
 frame means,
 rim engaging means mounted on said frame means for engaging the opposite sides of a wheel rim,
 first means,
 bead breaking means mounted on one end of said first means, said first means being movably mounted on said frame means for movement in a direction generally parallel to the central axis of said wheel rim and constructed and arranged to position said bead breaking means in contact with the tire bead adjacent said wheel rim,
 second means, including a single power source, removably mounted on said frame means and engageable with the other end of said first means for forcing said bead breaking means into high pressure engagement with said tire bead to move the same away from the wheel rim,
 said first means including a pair of elongate means mounted for sliding movement on said frame means on opposite sides of said wheel and extending in said direction, one end of each of said first means being disposed adjacent said wheel rim, said second means being removably mountable in engagement with the other end of either of said elongate means for applying a bead breaking force to said first means.

3. The bead breaking device set forth in claim 2 wherein said rim engaging means are movable in said direction, the application of force on said first means being operative to lock said rim engaging means in position.

4. The apparatus set forth in claim 2 wherein each of said bead breaking means has a relatively elongate bead breaking tip formed on one end thereof and its other end is pivotally mounted on said first means and an arcuate surface formed between said tip and other end for engaging the side of a tire.

5. The device set forth in claim 2 wherein said frame means generally has a pair of arm means for straddling said wheel rim, and first means and bead breaking means disposed on each of said arm means, each of said bead breaking means being directed inwardly toward said tire.

6. The device set forth in claim 5 wherein said frame means including a generally U-shaped portion and including means for adjusting the distance between said arm means, one of said first means and bead breaking means being mounted on each of said arm means.

7. The apparatus set forth in claim 5 and including stop means formed on each of said bead breaking means for engaging said wheel rim after the bead at one side of said tire has been broken to force said bead breaking means at the other side of said rim into bead breaking engagement with the opposite side of said tire.

8. The apparatus set forth in claim 7 wherein each of said bead breaking means has a relatively elongate bead breaking tip formed on one end thereof and its other end is pivotally mounted on its respective first means and an arcuate surface formed between the said tip and other end for engaging the side of a tire.

9. The apparatus set forth in claim 8 and including means for positioning said frame means at an inclined angle for positioning said bead breaking means in a substantially tangential relation relative to the wheel rim, and means for adjusting the angle of incidence of said frame means to change the angle of said bead breaking means for use with different sized tire rims.

10. The apparatus set forth in claim 2 wherein each of said bead breaking means has a relatively elongate bead breaking tip formed on one end thereof and its other end is pivotally mounted on the one end of said first means and about an axis generally normal to the axis of said wheel rim, and an arcuate surface formed on said bead breaking means and between the said tip and other end for engaging the side of a tire.

11. The bead breaking device set forth in claim 10 wherein each of said elongate means comprises at least one elongate rod means and bearing means mounted on said frame means for supporting said rod means.

12. The bead breaking device set forth in claim 10 wherein each of said elongate means comprises a pair of rods disposed in a parallel relation, support means at one end of said rods for supporting said bead breaking means and a pair of parallel bearing means mounted on said frame means for supporting said rods.

13. The apparatus set forth in claim 2 and including mounting means for adjusting the angle of said frame means relative to said wheel rim for positioning said bead breaking means whereby said bead breaking means may be positioned in each of a plurality of positions for use with different sized tire rims, and further including means rollably supporting said frame means for translation into and out of alignment with said wheel rim.

14. A device for breaking tire beads comprising:
frame means having a pair of arm means for straddling a wheel rim, said frame means being generally U-shaped and including means for adjusting the distance between said arm means,
rim engaging means mounted on each of said arm means, each of said rim engaging means being movable on said frame in a direction generally parallel to the axis of said wheel rim,
a pair of first means each including elongate means, one of said elongate means being mounted for sliding movement on each arm means of said frame means and extending in said direction, one of the ends of each of said elongate means being disposed adjacent said wheel rim, each of said elongate means comprising at least one elongate rod means and bearing means mounted on said frame means for supporting each of said rod means,
bead breaking means mounted on said one end of each of said elongate means, each of said bead breaking means having a relatively elongate bead breaking tip formed on one side and its other side being pivotally mounted on its respective elongate means and an arcuate surface formed between the said tip and the other side for engaging the side of a tire, said first means being constructed and arranged to position said bead breaking means in contact with the tire bead adjacent said wheel rim,
second means engageable with one of said elongate means for forcing said bead breaking means into high pressure engagement with said tire bead to move the same away from the wheel rim, said second means being operative to apply a bead breaking force to the end of said elongate means opposite said bead breaking means, the application of a bead breaking force to said elongate means being operative to lock said rim engaging means in position,
stop means formed on each of said bead breaking means for engaging said wheel rim after the bead at one side of said tire has been broken to force said bead breaking means at the other side of said rim into bead breaking engagement with the opposite side of said tire, and
means for positioning said frame means at an inclined angle for positioning said bead breaking means in a substantially tangential relation relative to said wheel rim, and means for adjusting the angle of incidence of said frame means to change the angle of said bead breaking means for use with different size tire rims.

15. The bead breaking device set forth in claim 14 wherein each of said elongate means comprises a pair of rods disposed in a parallel relation, support means at one end of said rods for supporting said bead breaking means and a pair of parallel bearing means mounted on said frame means for supporting said rods.

16. The bead breaking device set forth in claim 15 wherein said second means includes a power source removably mountable on either arm of said frame means and engageable with the end of either of said first means which is opposite said bead breaking means.

17. The bead breaking device set forth in claim 16 wherein each of said arm means is generally elongate, the bead breaking means being mounted adjacent one end of its respective arm means, and a pair of mounting means disposed generally vertically, one of said mounting means being located adjacent each of said arm means, and post means mounted adjacent the one end of each of said arm means for slidably engaging one of said pair of mounting means, and adjusting means mounted on each of said arm means and post means for adjusting the elevation of said arm means on said post means.

18. The bead breaking device set forth in claim 17 wherein said adjusting means includes handle means pivotally coupled to at least one of said arms and to its associated post means, said adjusting means being pivotally mounted on said arm means and pivotally coupled to its associated post means for supporting said arm means at selective elevations thereof.

19. A device for breaking tire beads comprising:
frame means,
rim engaging means mounted on said frame means for engaging the opposite sides of a wheel rim,
a pair of bead breaking means one being mounted on each of a pair of spaced apart portions of said frame means, said bead breaking means being movably mounted on said frame means for positioning one end of each bead breaking means in contact with the tire bead adjacent said wheel rim,
second means selectively removably mountable on either of said spaced apart portions of said frame means for forcing either of said bead breaking means into high pressure engagement with said tire bead to move the same away from the wheel rim, said bead breaking means each comprising at least one elongate sliding member mounted on said frame means for movement in a direction generally parallel to the axis of said wheel rim, the other end of each said bead breaking means including an engageable portion for engaging said second means, and including mounting means on said spaced apart portions of frame means for removably receiving said second means to selectively locate said second means in position for engagement with one of said bead breaking means mounted on the spaced apart portions of said frame means, said second means including means for removably receiving a power source for forcing either of said bead breaking means into engagement with said tire bead.

20. The bead breaking device set forth in claim 19 including means rollably supporting said frame means whereby said frame means may be selectively positioned adjacent a wheel mounted on a vehicle.

21. A device for breaking the beads of a tire mounted on a wheel rim comprising:

frame means having a pair of arms for straddling said wheel rim, rim engaging means mounted on said frame means for engaging the opposite sides of a wheel rim, first means mounted on each of said arms, bead breaking means mounted on one end of eacch of said first means and directed inwardly toward said tire, said first means being movably mounted on said frame means for movement in a direction generally parallel to the central axis of said wheel rim and constructed and arranged to position said bead breaking means in contact with the tire bead adjacent said wheel rim, second means including a single power source removably mounted on said frame means and engageable with the other end of said first means for forcing said bead breaking means into high pressure engagement with said tire bead to move the same away from the wheel rim, stop means formed on each of said bead breaking means for engaging said wheel rim after the bead at one side of said tire has been broken to force said bead breaking means at the other side of said rim into bead breaking engagement with the opposite side of said tire, each of said bead breaking means having a relatively elongate bead breaking tip formed on one end thereof and its other end is pivotally mounted on its respective first means and an arcuate surface formed between the said tip and other end for engaging the side of a tire, means for positioning said frame means at an inclined angle for positioning said bead breaking means in a substantially tangential relation relative to the wheel rim, means for adjusting the angle of incidence of said frame means to change the angle of said bead breaking means for use with different sized tire rims, each of said first means comprising elongate means mounted for sliding movement on said frame means and extending in said direction, the one ends of said first means being disposed adjacent said wheel rim, said second means being removably mounted on either arm of said frame means for being coupled to either of the other ends of said first means.

22. The bead breaking device set forth in claim 21 wherein each of said elongate means comprises at least one elongate rod means and bearing means mounted on said frame means for supporting each of said rod means.

23. The device set forth in claim 22 wherein said frame means is generally U-shaped and including means for adjusting the distance between said arm means.

24. A device for breaking tire beads comprising:

frame means, rim engaging means mounted on said frame means for engaging the opposite sides of a wheel rim, first means, bead breaking means mounted on one end of said first means, said first means being movably mounted on said frame means for movement in a direction generally parallel to the central axis of said wheel rim and constructed and arranged to position said bead breaking means in contact with the tire bead adjacent said wheel rim, second means including a single power source removably mounted on said frame means and engageable with the other end of said first means for forcing said bead breaking means into high pressure engagement with said tire bead to move the same away from the wheel rim, mounting means for adjusting the angle of said frame means relative to said wheel rim for positioning said bead breaking means whereby said bead breaking means may be positioned in each of a plurality of positions for use with different sized tire rims, and further including means rollably supporting said frame means for translation into and out of engagement with said wheel rim, said frame means has a generally elongate portion, said bead breaking means being mounted adjacent one end of said frame means, mounting means disposed generally vertically on said frame means, post means mounted adjacent said one frame end for engaging said mounting means and adjusting means mounted on said mounting means for angularly adjusting said frame means on said post means.

25. The bead breaking device set forth in claim 24 wherein said adjusting means includes handle means pivotally coupled to said frame means and to said post means, for supporting said frame means on said post means at selective elevations thereof.

26. A device for breaking tire beads comprising:

frame means, rim engaging means mounted on said frame means for engaging the opposite sides of a wheel rim, a pair of bead breaking means, one being mounted on each of a pair of spaced apart portions of said frame means, said bead breaking means being movably mounted on said frame means for positioning one end of each bead breaking means in contact with the tire bead adjacent said wheel rim, second means selectively removably mountable on either of said spaced apart portions of said frame means for forcing either of said bead breaking means into high pressure engagement with said tire bead to move the same away from the wheel rim,
means rollably supporting said frame means whereby said frame means may be selectively positioned adjacent a wheel mounted on a vehicle,
said frame means comprising a generally U-shaped section having a pair of spaced arm means extending therefrom, one of said bead breaking means being mounted on each of said arm means, and including
generally vertically extending post means slidably engaging each of said arm means, and
adjusting means pivotally coupled between said post means and said arm means for selectively varying the inclination of said frame means relative to a horizontal plane.

* * * * *